July 10, 1928.

A. E. ANDERSON 1,676,314

AUTOMATIC RECLOSING CIRCUIT BREAKER SYSTEM

Original Filed Nov. 23, 1922

Inventor:
Arvid E. Anderson,
by
His Attorney.

Patented July 10, 1928.

1,676,314

UNITED STATES PATENT OFFICE.

ARVID E. ANDERSON, OF SCHENECTADY, NEW YORK, ASSIGNOR TO GENERAL ELECTRIC COMPANY, A CORPORATION OF NEW YORK.

AUTOMATIC RECLOSING CIRCUIT-BREAKER SYSTEM.

Application filed November 23, 1922, Serial No. 602,691. Renewed May 26, 1928.

My invention relates to automatic reclosing circuit breaker systems and particularly to such systems in which a circuit breaker is arranged to connect together two sections of an electric system, each of which may be independently energized at certain times.

One object of my invention is to provide an improved reclosing circuit breaker system of the above mentioned type whereby the closing of the circuit breaker may be effected when either one of the sections is energized and the load conditions on the other section are such that the circuit breaker may be closed.

Another object of my invention is to provide in such a system an improved circuit arrangement whereby the closing coil of the circuit breaker is supplied with current from the section having the greater voltage when the circuit breaker is open, and the voltage difference between the two sections is sufficient to operate a sensitive relay which controls the closing coil circuit.

My invention will be better understood from the following description taken in connection with the accompanying drawing, and its scope will be pointed out in the appended claims.

Figure 1:
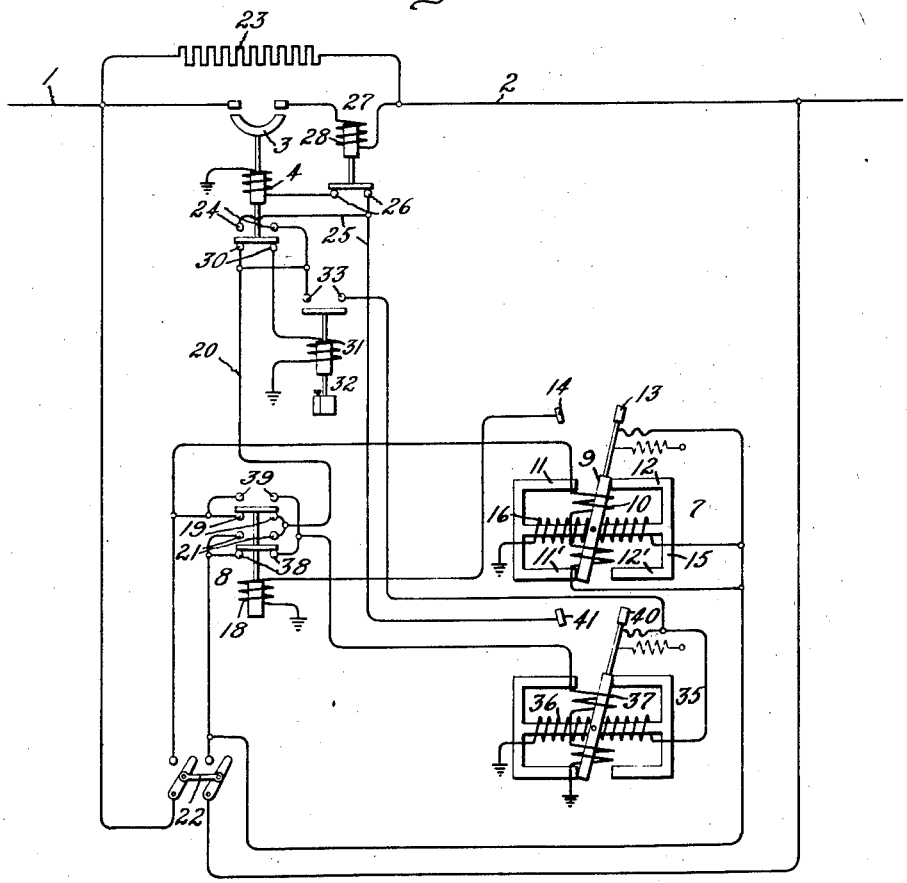
Figure 2:
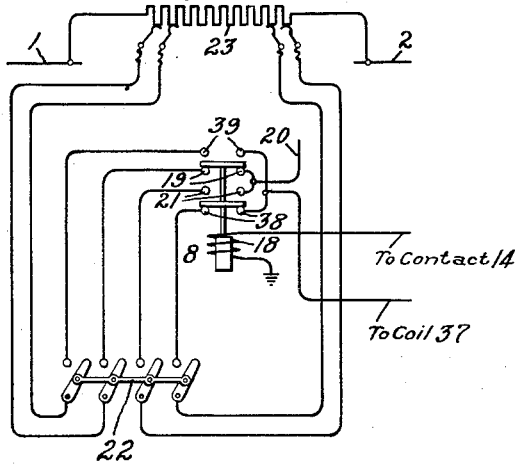

Referring to the accompanying drawing, Fig. 1 shows an automatic reclosing circuit breaker system embodying my invention, and Fig. 2 shows a modification of a portion of the system shown in Fig. 1.

Referring to Fig. 1, 1 and 2 represent conductors of two sections of a distribution system which are arranged to be connected together by a circuit breaker 3 of any suitable type. The sections of the system represented by the conductors 1 and 2 are assumed to be energized independently from a suitable source or sources of current, not shown, in a manner well known in the art. The conductors 1 and 2 may, for example, be considered as sections of a trolley circuit, or feeder circuit for a trolley system, which feed current to the load. The return circuit may be assumed to be through the ground, although it is apparent that it is immaterial whether a grounded return or any other return wire is used. The circuit breaker 3, as hereinafter described, is arranged to open automatically whenever there is an overload which may, for example, be due to a short circuit on either section of the system. It is desired that the circuit breaker 3 be automatically reclosed whenever the abnormal condition on the circuit disappears so that the circuit breaker may be reclosed without damage to the system. It is also desirable to arrange the reclosing mechanism for the circuit breaker so that it may be operated from current supplied by the sections 1 or 2, since in this way it is unnecessary to provide any additional source of current for the reclosing mechanism. If the sections 1 and 2 were always supplied with current at normal voltage, it is apparent that the reclosing mechanism might be supplied from either section. When, however, a short circuit or similar abnormal condition develops on one of the sections so as to cause the opening of the circuit breaker to disconnect the sections it is apparent that the voltage on the faulty section may be so low as to interfere with the operation of reclosing mechanism connected to such section. If it should happen that there is no source of current supplying the faulty section from the other end, and the circuit breaker 3 entirely disconnected the two sections, then there would be no voltage whatever on the faulty section and it would be impossible to operate the reclosing mechanism from such section. According to my invention I arrange the reclosing mechanism so that the control circuits for the closing of the circuit breaker are selectively energized from the section having the higher voltage whichever section this may be. Therefore, as long as either section 1 or 2 is energized, the circuit breaker may be reclosed automatically.

A resistor 23 is preferably connected across the circuit breaker so that one section may be fed from the other even when the circuit breaker is open so as to make it possible to supply the faulty section with a small current from the other section, which current may be used to operate a reclosing relay 35 which initiates the closing operation of the circuit breaker when the load resistance reaches a desired predetermined value. In its broader aspects, however, my invention is not limited to the use of a reclosing relay supplied through such a resistor since the arrangement for connecting the reclosing mechanism to the section having the higher voltage may be used without any desired arrangement for initiating the reclosing operation after the circuit breaker has opened.

Any suitable means may be used for closing the circuit breaker and in the drawing I have shown a closing coil 4 for this purpose, which coil when energized closes the circuit breaker and holds it closed as long as the voltage supplied thereto is above a predetermined value. In order to energize the closing coil 4 from that section which has the higher voltage and thus impress substantially normal voltage thereon, I provide two energizing circuits for coil 4 and arrange a directional relay 7 and a selective relay 8, to control these circuits. The directional relay 7 comprises an armature 9 pivotally mounted within a winding 10 connected between the conductors 1 and 2 by means of the manually controlled switch 22 and in multiple with the contacts of the circuit breaker 3 so that the winding 10 is short circuited when the circuit breaker is closed. The armature 9 is also mounted between the polar projections 11, 11' and 12, 12' having opposite polarities. The armature 9 carries a contact 13 which is adapted to engage a stationary contact 14. A suitable spring may be provided, if desired, which tends to maintain the contact 13 out of engagement with contact 14. The magnetic structure 15 of the relay 7 is magnetized by a winding 16 connected by means of the switch 22, between the conductor 2 and ground which represents the third or return conductor of the two sections to be connected together. The windings 10 and 16 are arranged so that when the circuit breaker 3 is open and current flows through the winding 10 from conductor 1 to conductor 2 the polarities of the ends of the armature 9 and polar projections are such that the armature tends to move the contact 13 out of engagement with contact 14 and when current flows from conductor 2 to conductor 1 the armature tends to move the contact 13 into engagement with the contact 14. The relay 7 is designed so that substantially normal voltage has to be impressed on winding 16 and the current through the winding 10 from conductor 2 to conductor 1 has to be above a certain amount in order to cause the armature 9 to move from the position shown in the drawing to the position in which the contacts 13 and 14 are closed, and when the contacts are closed the current through the winding 10 from conductor 1 to conductor 2 has to be above a certain amount in order to cause the contacts 13 and 14 to open. With such an arrangement the relay 7 does not operate its contacts when the circuit breaker 3 is closed and the small current flowing through the winding 10 reverses. Therefore, after the circuit breaker closes the armature 9 remains in the position in which it was when the circuit breaker 3 closed.

The closing of the contacts 13 and 14, which occurs when the voltages across the two sections are such, when the circuit breaker 3 is open, that current flows from conductor 2 to conductor 1, thereby indicating that the voltage between the conductor 2 and ground is greater than the voltage between conductor 1 and ground, connects the coil 18 of the relay 8 between the conductor 2 and ground. The circuit of the coil 18 also includes contacts of the switch 22. The relay 8 is provided with contacts 19 which, when the coil 18 is deenergized connect the conductor 20 to the conductor 1 through the contacts of the manually controlled switch 22, and is also provided with the contacts 21 which when the coil 18 is energized, connect the conductor 20 to the conductor 2, through the contacts of the switch 22. It is to be understood, however, that my invention is not limited to having the conductor 20 connected directly to either of the conductors 1 or 2 since conductor 20 may be connected thereto in the manner shown in Fig. 2. In this figure the conductor 20 is connected to each conductor through a portion of a current limiting device, such as a resistor 23, which is arranged to be connected in series with the conductors 1 and 2 when the circuit breaker 3 opens so as to limit the current supplied to the overload or short circuit. It is preferable, however, to have the conductor 20 directly connected to either the conductor 1 or the conductor 2 so that full voltage is impressed upon the windings which are connected between the conductor 20 and ground. In order to cover these different connections of the conductor 20 to the conductors 1 and 2, above described, it is to be understood that in the appended claims a point on said resistance includes the ends of the current limmiting means 23 as well as any intermediate point.

When the circuit breaker 3 is closed, the circuit of the closing coil 4 is as follows: from either the conductor 1 or the conductor 2, depending upon whether the relay 18 is deenergized or energized, conductor 20, auxiliary contacts 24 on the circuit breaker 3, which are closed when the circuit breaker is closed, conductor 25, contacts 26 of the overload relay 27, closing coil 4 to ground. The winding 28 of the overload relay 27 is connected to the conductors 1 and 2 so that the current through it varies in accordance with the current flowing through the contacts of the circuit breaker 3 when the circuit breaker is closed and is so designed that it does not open its contacts until the current exceeds a predetermined value.

The circuit breaker 3 is provided with the auxiliary contacts 30 which are closed when the circuit breaker is open. These contacts are arranged to connect the coil 31 of a time relay 32 between the conductor 20 and ground. The time relay 32 which delays the reclosing of the circuit breaker after it has been opened is arranged in any suitable manner so that it does not close its contacts 33 until after the coil 31 has been energized a certain length of time.

In the arrangement illustrated, the reclosing of the circuit breaker is controlled by the reclosing relay 35 which is similar in construction to the directional relay 7 and which operates to effect the reclosing of the circuit breaker when the load resistance on the overloaded section exceeds a predetermined value. The magnetizing winding 36 of the relay 35 is arranged to be connected across the section having the higher voltage, when the circuit breaker is open, by means of the time relay 32 which completes the circuit of the winding between the conductor 20 and ground. The operating winding 37 of the relay 35 is arranged to be connected across the section having the lower voltage by means of contacts 38 and 39 of the relay 8, and contacts of the switch 22. It is to be understood, however, that my invention is not limited to having the coils 37 connected directly across the sections since this coil may be connected to any suitable point between the ends of the resistor 23, so that portions of the resistor are connected in series therewith as shown in Fig. 2. When the coil 18 of the relay 8 is not energized the contacts 38 are closed so that the operating winding 37 is connected between the conductor 2 and ground. When the coil 18 of the relay 8 is energized the contacts 39 are closed so that the winding 37 is connected between the conductor 1 and ground. The relay 35 is arranged to close its contacts 40 and 41 when the voltage impressed upon the operating winding 37 exceeds a predetermined value and the magnetizing winding 36 is energized. The closing of the contacts 40 and 41 completes a circuit for the closing coil 4 of the circuit breaker 3 to close the circuit breaker. This circuit is as follows: from the conductor 20 which is connected to either the conductor 1 or the conductor 2 by the relay 8, contacts 33 of the time relay 32, contacts 40 and 41 of the reclosing relay 35, conductor 25, contacts 26 of the overload relay 27, closing coil 4 of the circuit breaker 3 to ground.

The operation of the system shown is as follows: Assuming that the switch 22 is closed, the armature 9 of the directional relay 7 in the position shown and the coil 18 of the relay 8 deenergized, and assuming that the load conditions on both sections of the electric system are normal, the circuit breaker 3 will be held in its closed position by the circuit of the closing coil 4 heretofore traced. Since the auxiliary contacts 30 on the circuit breaker 3 are open, the coils 31 and 36 of the time relay 32 and the reclosing relay 35, respectively, are deenergized.

Since the circuit breaker short circuits the resistor 23 and the winding 10 of the directional relay 7 substantially none of the current that flows from conductor 1 to conductor 2 flows through either of these devices.

In case of a short circuit or overload on either section the current through the coil 28 of the overload relay 27 increases to such a value that the relay opens its contacts 26 thereby opening the circuit of the closing coil 4 and causing the circuit breaker 3 to open. Let it be assumed that the short circuit occurs between conductor 1 and ground, and that a suitable source of current is connected between conductor 2 and ground so that the voltage across this portion of the circuit is substantially normal after the circuit breaker opens. Therefore, when the circuit breaker opens the voltage between the conductor 1 and ground is less than the voltage between conductor 2 and ground so that currents flows from conductor 2 through the resistor 23 and also through the winding 10 of the directional relay 7 to the conductor 1. The direction of current through the winding 10 is such that the relay 7 closes its contacts 13 and 14 thereby connecting the coil 18 of the relay 8 between the conductor 2 and ground. Relay 8 then opens its contacts 19 and 38 and closes its contacts 21 and 39 so that the conductor 20 is disconnected from conductor 1 and is connected to the conductor 2 and the operating winding 37 of the reclosing relay 35 is disconnected from between conductor 2 and ground and is connected between the conductor 1 and ground.

The closing of the auxiliary contacts 30 of the circuit breaker 3, when it opens, completes after the relay 18 operates, the following circuit of the coil 31 of the time relay 32: from conductor 2 through contacts of the switch 22, contacts 21 of the relay 8, conductor 20, contacts 30 of the circuit breaker 3, coil 31 of the time relay 32 to ground. After a predetermined time the relay 32 closes its contacts 33 thereby completing the following circuit for the magnetizing winding 36 of the reclosing relay 35: from the conductor 2 through contacts of the switch 22, contacts 21 of the relay 8, conductor 20, contacts 33 of the time relay 32, magnetizing winding 36 of the reclosing relay 35 to ground.

When the resistance of the load connected between the conductor 1 and ground increases to a predetermined value, the voltage between the conductor 1 and ground, and consequently the voltage impressed upon the operating winding 37 of the reclosing relay 35, increases to a value sufficient to cause the reclosing relay 35 to close its contacts 40 and 41. The closing of the contacts 40 and 41 completes the following circuit for the closing coil 4 of the circuit breaker 3 to close the circuit breaker: from the conductor 2 through contacts of the switch 22, contacts 21 of the relay 8, conductor 20, contacts 33 of the time relay 32, contacts 40 and 41 of the reclosing relay 35, conductor 25, contacts 26 of the overload relay 27, closing coil 4 of the circuit breaker 3 to ground. When the circuit breaker 3 closes it completes the circuit heretofore traced for the closing coil 4 through the auxiliary contacts 24. This circuit is independent of the contacts 33 of time relay 32 so that when these contacts open after the circuit breaker closes, the closing coil 4 remains energized. The opening of the auxiliary contacts 30 of the circuit breaker 3 deenergizes the coil 31 of the time relay 32 which in turn opens its contacts 33, thereby opening the circuit of the magnetizing winding 36 of the reclosing relay 35. Although the winding 10 of the directional relay 7 is short circuited when the circuit breaker 3 closes, as heretofore stated, this relay is so designed that the energization of the magnetizing winding 16 is sufficient to maintain the relay in the position in which it was when the circuit breaker closed. Therefore, the coil 18 of the relay 8 remains energized after the circuit breaker closes so that the closing coil 4 remains connected between the conductor 2 and ground.

From the above description it is evident that the closing coil 4 of circuit breaker 3, the coil 31 of the time relay 32 and the magnetizing coil 36 of relay 35 are connected across the section having the higher voltage and the operating coil 37 of relay 35 is connected across the section having the lower voltage.

Let it now be assumed that while the contacts 13 and 14 are closed, a short circuit occurs between the conductor 2 and ground, and a suitable source of current is connected between the conductor 1 and ground so that substantially normal voltage is maintained between conductor 1 and ground after the circuit breaker opens. The overload relay 28 operates in the manner above described to effect the opening of the circuit breaker 3. As soon as the circuit breaker opens, current flows from the conductor 1 to the conductor 2 through the resistor 23 and through the winding 10 of the directional relay 7. The current through the winding 10 is now in a direction to cause the relay 7 to open its contacts 13 and 14 so that the coil 18 of the relay 8 is deenergized. The relay 8 then opens its contacts 21 and 39 and closes its contacts 19 and 38 thereby connecting the conductor 20 to the conductor 1 and the operating coil 37 of the reclosing relay 35 between the conductor 2 and ground.

The circuit breaker 3 is then reclosed in the same manner as above described, except that the coils 4, 31 and 36 are connected between the conductor 1 and ground, the coil 37 of relay 35 is connected between conductor 2 and ground and the reclosing relay 35 operates in response to the load resistance between the conductor 2 and ground.

It is evident that if the short circuit or overload should occur between the conductor 1 and ground while contacts 13 and 14 of the directional relay 7 were closed, the contacts would remain closed and the operation would be the same as the first operation heretofore described. Similarly, if the short circuit or overload should occur between the conductor 2 and ground while the contacts 13 and 14 were open, the contacts 13 and 14 would remain open and the operation would be the same as the second operation above described. Therefore, it is evident that the closing coil 4 of circuit breaker 3, the coil 31 of the time relay 32 and the magnetizing coil 36 of relay 35 are always connected to the section having the higher voltage and the operating coil 37 of relay 35 is connected to the section having the lower voltage.

The particular arrangement shown for effecting the reclosing of the circuit breaker in response to the load resistance is covered by Letters Patent 1,567,016, granted December 22, 1925, to Oliver C. Traver and assigned to the same assignee as this application.

While I have shown and described several modifications of my invention, I do not desire to be limited thereto but seek to cover in the appended claims all those modifications that fall within the true spirit and scope of my invention.

What I claim as new and desire to secure by Letters Patent of the United States, is:—

1. In an automatic reclosing circuit breaker system in which two sections of an electric system are arranged to be connected together by means of a circuit breaker, the combination of a coil adapted when energized to effect the closing of said circuit breaker, two circuits for said coil, means arranged to be operated in accordance with the relative voltages across said sections when said circuit breaker is open for selectively controlling said circuits, and reclosing means responsive to a predetermined load condition of the section having the lower voltage for controlling the circuits of said coil.

2. In an automatic reclosing circuit breaker system, in which two sections of an electric system are arranged to be connected together by means of a circuit breaker, the combination of a coil adapted to be energized to effect the closing of said circuit breaker, two circuits for said coil, one of said circuits being arranged to be connected across one of said sections and the other of said circuits being arranged to be connected across the other of said sections, means arranged to be operated in accordance with the relative voltages across said sections when said circuit breaker is open to prevent the coil circuit which is arranged to be connected across the section having the lower voltage from being completed, and means adapted to be operated to effect the completion of the coil circuit which is arranged to be connected across the section having the higher voltage.

3. In an automatic reclosing circuit breaker system, in which two sections of an electric system are arranged to be connected together by means of a circuit breaker, the combination of a coil adapted to be energized to effect the closing of said circuit breaker, two circuits for said coil, one of said circuits being arranged to be connected across one of said sections and the other of said circuits being arranged to be connected across the other of said sections, means arranged to be operated in accordance with the relative voltages across said sections when said circuit breaker is open to prevent the coil circuit which is arranged to be connected across the section having the lower voltage from being completed, and means operative in response to the voltage across the section having the lower voltage to effect the completion of the coil circuit which is arranged to be connected across the section having the higher voltage.

4. In an automatic reclosing circuit breaker system, the combination of two conductors of an electric system, a circuit breaker arranged to connect said two conductors together, a current limiting device arranged to be connected between said two conductors when said circuit breaker is open, a third conductor common to said two conductors, a coil adapted to be energized to effect the closing of said circuit breaker, connections whereby said coil may be connected between said third conductor and either one of two points on said current limiting device, means operative in accordance with the relative potentials of said two conductors when said circuit breaker is open to effect the connection of said coil to the point on said current limiting device having the higher potential with respect to said third conductor, and means adapted to be operated to effect the energization of said coil.

5. In an automatic reclosing circuit breaker system, the combination of two sections of an electric system, a circuit breaker arranged to connect said sections together, a current limiting device arranged to be connected between said sections when said circuit breaker is open, a coil adapted to be energized to effect the closing of said circuit breaker, connections whereby said coil may be connected to either one of two points on said current limiting device, means operative in accordance with the relative potentials across said sections when said circuit breaker is open to effect the connection of said coil to the point on said current limiting device having the higher potential, means operative in response to voltage across the section having the lower potential to effect the energization of said coil, and means for preventing the operation of said last mentioned means until said circuit breaker has been open a predetermined time.

6. In an automatic reclosing circuit breaker system, the combination of two sections of an electric system, a circuit breaker arranged to connect said sections together, a current limiting device arranged to be connected between said sections when said circuit breaker is open, a coil adapted to be energized to effect the closing of said circuit breaker, connections whereby said coil may be connected to either one of two points on said current limiting device, a directional relay operative to effect the connection of said coil to the point on said current limiting device having the higher potential, said relay having a winding connected to said current limiting device so that the magnitude and direction of the current through said winding varies in accordance with the magnitude and direction of the current through said current limiting device, and means adapted to be operated to effect the energization of said coil.

7. In an automatic reclosing circuit breaker system, the combination of two sections of an electric system, a circuit breaker arranged to connect said sections together, a current limiting device arranged to be connected between said sections when said circuit breaker is open, a coil adapted to be energized to effect the closing of said circuit breaker, two circuits for said coil, one of said circuits being arranged to be connected across one of said sections and the other of said circuit being arranged to be connected across the other of said sections, a directional relay operative to prevent the coil circuit which is arranged to be connected across the section having the lower voltage from being completed, said relay having a winding connected to said sections so that the magnitude and direction of the current through said winding varies in accordance with the magnitude and direction of the current through said current limiting device, and means adapted to be operated in response to voltage across the section having the lower voltage to effect the completion of the coil circuit which is arranged to be connected across the section having the higher voltage.

8. In an automatic reclosing circuit breaker system, the combination of two sections of an electric system, a circuit breaker arranged to connect said sections together, a current limiting device arranged to be connected between said sections when said circuit breaker is open, a coil adapted to be energized to effect the closing of said circuit breaker, two circuits for said coil, one of said circuits being arranged to be connected across one of said sections and the other of said circuits being arranged to be connected across the other of said sections, a relay for controlling said circuits, and means arranged to be operated in accordance with the relative voltages across said sections when said circuit breaker is open to prevent the closing coil circuit which is arranged to be connected across the section having the lower voltage from being completed and to effect the connection of said relay across the section having the lower voltage.

9. In an automatic reclosing circuit breaker system, the combination of two sections of an electric system, a circuit breaker arranged to connect said sections together, a current limiting device arranged to be connected between said sections when said circuit breaker is open, a coil adapted to be energized to effect the closing of said circuit breaker, two circuits for said coil, one of said circuits being arranged to be connected across one of said sections and the other of said circuits being arranged to be connected across the other of said sections, a reclosing relay for controlling said circuits, and a directional relay having a winding connected between said sections when said circuit breaker is open arranged to prevent the closing coil circuit which is arranged to be connected across the section having the lower voltage from being completed and to effect the connection of said relay across the section having the lower voltage.

10. In an automatic reclosing circuit breaker system, the combination of two sections of an electric system, a circuit breaker arranged to connect said sections together, a current limiting device arranged to be connected between said sections when said circuit breaker is open, a coil adapted to be energized to effect the closing of said circuit breaker, two circuits for said coil, one of said circuits being arranged to be connected across one of said sections and the other of said circuits being arranged to be connected across the other of said sections, a reclosing relay for controlling said circuits, having a magnetizing winding and an operating winding, and a directional relay having a winding connected between said sections when said circuit breaker is open arranged to prevent the closing coil circuit which is arranged to be connected across the section having the lower voltage from being completed and to effect the connection of said magnetizing winding of said relay across the section having the higher voltage and the connection of said operating winding of said relay across the section having the lower voltage.

11. In an automatic reclosing circuit breaker system in which two sections of an electric system are arranged to be connected together by a circuit breaker, electroresponsive means for controlling the closing of said circuit breaker, and a directional relay comprising a winding connected between said sections while said circuit breaker is open, and means controlled by said relay for selectively connecting said electroresponsive means to the section having the higher voltage.

12. In an automatic reclosing circuit breaker system in which two sections of an electric system are arranged to be connected together by a circuit breaker, a current limiting device connected across said circuit breaker, electroresponsive means for controlling the closing of said circuit breaker, a reclosing relay for controlling the energization of said electroresponsive means, and means connected to be operated in accordance with the relative voltages of said sections for selectively connecting said electroresponsive means to the section having the higher voltage and selectively connecting said reclosing relay to be operated in accordance with the voltage of the section having the lower voltage.

In witness whereof, I have hereunto set my hand this 22nd day of November, 1922.

ARVID E. ANDERSON.